United States Patent
Hong et al.

(10) Patent No.: US 7,417,996 B2
(45) Date of Patent: Aug. 26, 2008

(54) METHOD AND APPARATUS FOR COMMUNICATION BETWEEN COORDINATOR-BASED WIRELESS NETWORK AND DIFFERENT TYPE OF NETWORK WHICH ARE INTERCONNECTED THROUGH A BACKBONE NETWORK

(75) Inventors: Jin-woo Hong, Seoul (KR); Dae-gyu Bae, Suwon-si (KR); Hyun-ah Sung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 188 days.

(21) Appl. No.: 11/117,513

(22) Filed: Apr. 29, 2005

(65) Prior Publication Data

US 2005/0243787 A1    Nov. 3, 2005

(30) Foreign Application Priority Data

Apr. 29, 2004 (KR) .................. 10-2004-0030121

(51) Int. Cl.
  *H04L 12/28* (2006.01)
(52) U.S. Cl. ............... 370/401; 370/310.2; 370/312; 370/328; 370/349; 370/392; 370/395.21; 370/395.5; 370/468
(58) Field of Classification Search ............ 370/338, 370/310.2, 312, 320, 328, 349, 341, 348, 370/351, 389, 392, 395.21, 395.5, 449, 468, 370/401; 709/203, 223, 230
See application file for complete search history.

(56) References Cited

U.S. PATENT DOCUMENTS

| | | | | |
|---|---|---|---|---|
| 5,220,562 A * | 6/1993 | Takada et al. | ............... | 370/404 |
| 6,879,574 B2 * | 4/2005 | Naghian et al. | ............. | 370/338 |
| 6,925,064 B2 * | 8/2005 | Hester et al. | ................. | 370/255 |
| 7,016,336 B2 * | 3/2006 | Sorensen | ..................... | 370/351 |
| 7,088,702 B2 * | 8/2006 | Shvodian | ..................... | 370/348 |
| 2002/0061009 A1 | 5/2002 | Sorensen | | |
| 2003/0016636 A1 * | 1/2003 | Tari et al. | ..................... | 370/328 |
| 2003/0142643 A1 * | 7/2003 | Yang et al. | ................. | 370/328 |
| 2003/0152059 A1 * | 8/2003 | Odman | ....................... | 370/338 |

(Continued)

FOREIGN PATENT DOCUMENTS

JP      11-41271 A      2/1999

(Continued)

*Primary Examiner*—Matthew Anderson
*Assistant Examiner*—Shaima Q Aminzay
(74) *Attorney, Agent, or Firm*—Sughrue Mion, PLLC (57) ABSTRACT

A method and an apparatus for communication between a coordinator-based wireless network and a different type of network interconnected through a wired backbone network by means of a wired/wireless connecting device are disclosed. In the method, in order to communicate with a network device connected to a different type of network other than a coordinator-based wireless network, a network device in the coordinator-based wireless network provides a frame containing type information on the different type of network and information on a length of a physical address supported by the different type of network, and a wireless/wired connecting device converts the frame of the coordinator-based wireless network to another type of frame supported by the different type of network, and transmits the converted frame.

11 Claims, 10 Drawing Sheets

U.S. PATENT DOCUMENTS

| | | | |
|---|---|---|---|
| 2003/0179750 A1 | 9/2003 | Hasty, Jr. et al. | |
| 2003/0235175 A1* | 12/2003 | Naghian et al. | 370/338 |
| 2005/0152305 A1* | 7/2005 | Ji et al. | 370/328 |
| 2005/0221752 A1* | 10/2005 | Jamieson et al. | 455/1 |
| 2006/0080460 A1* | 4/2006 | Kobayashi et al. | 709/238 |

FOREIGN PATENT DOCUMENTS

| | | |
|---|---|---|
| JP | 2003-258827 A | 9/2003 |
| KR | 2000-0024790 A | 5/2000 |
| KR | 10-2005-0097425 A | 10/2005 |

* cited by examiner

Coordinator-based ad-hoc wireless network

Ad-hoc wireless network without coordinator

METHOD AND APPARATUS FOR COMMUNICATION BETWEEN COORDINATOR-BASED WIRELESS NETWORK AND DIFFERENT TYPE OF NETWORK WHICH ARE INTERCONNECTED THROUGH A BACKBONE NETWORK

CROSS-REFERENCE TO RELATED APPLICATION

This application claims the priority of Korean Patent Application No. 10-2004-0030121 filed on Apr. 29, 2004 in the Korean Intellectual Property Office, the disclosure of which is incorporated herein in its entirety by reference.

BACKGROUND OF THE INVENTION

1. Field of the Invention

The present invention relates to a method and an apparatus for communication between a coordinator-based wireless network and a different type of network interconnected through a backbone network, and more particularly to a method and an apparatus for communication between a coordinator-based wireless network and a different type of network interconnected through a wired backbone network by means of a wired/wireless connecting device.

2. Description of the Related Art

With the development of communication and network technologies, recent network environments have changed from wired network environments using wired media such as coaxial cables or optical cables to wireless network environments using radio signals over various frequency bands. Accordingly, computing devices (hereinafter, referred to as wireless network devices) have been developed, which include wireless network interface modules, have mobility, and perform specific functions by processing various information. In addition, wireless network technologies have emerged, which allow such wireless network devices to efficiently communicate with each other.

Generally, a wireless network may be classified into the following two types of networks.

Figure 1:
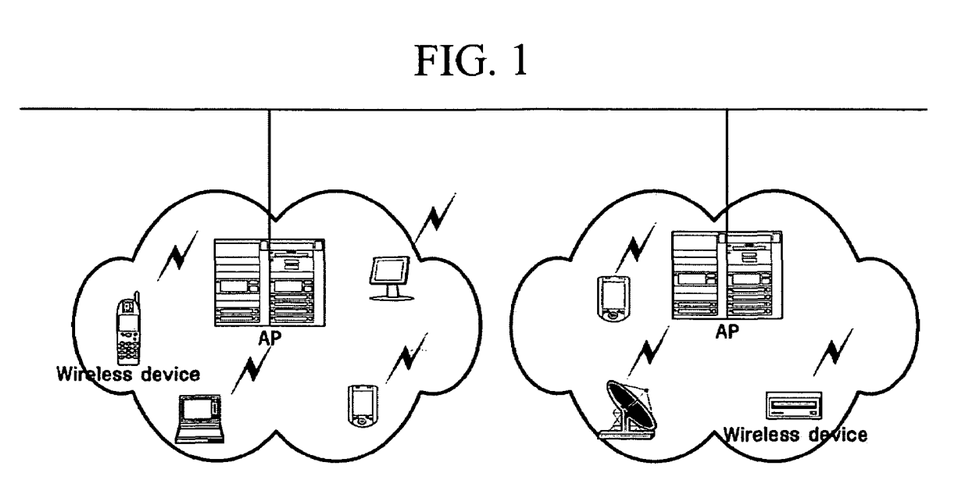
FIG. 1 is a view showing an infrastructure mode wireless network.

First, as shown in FIG. 1, there is a type of wireless network including an access point, which is called an infrastructure mode wireless network.

Figure 2:
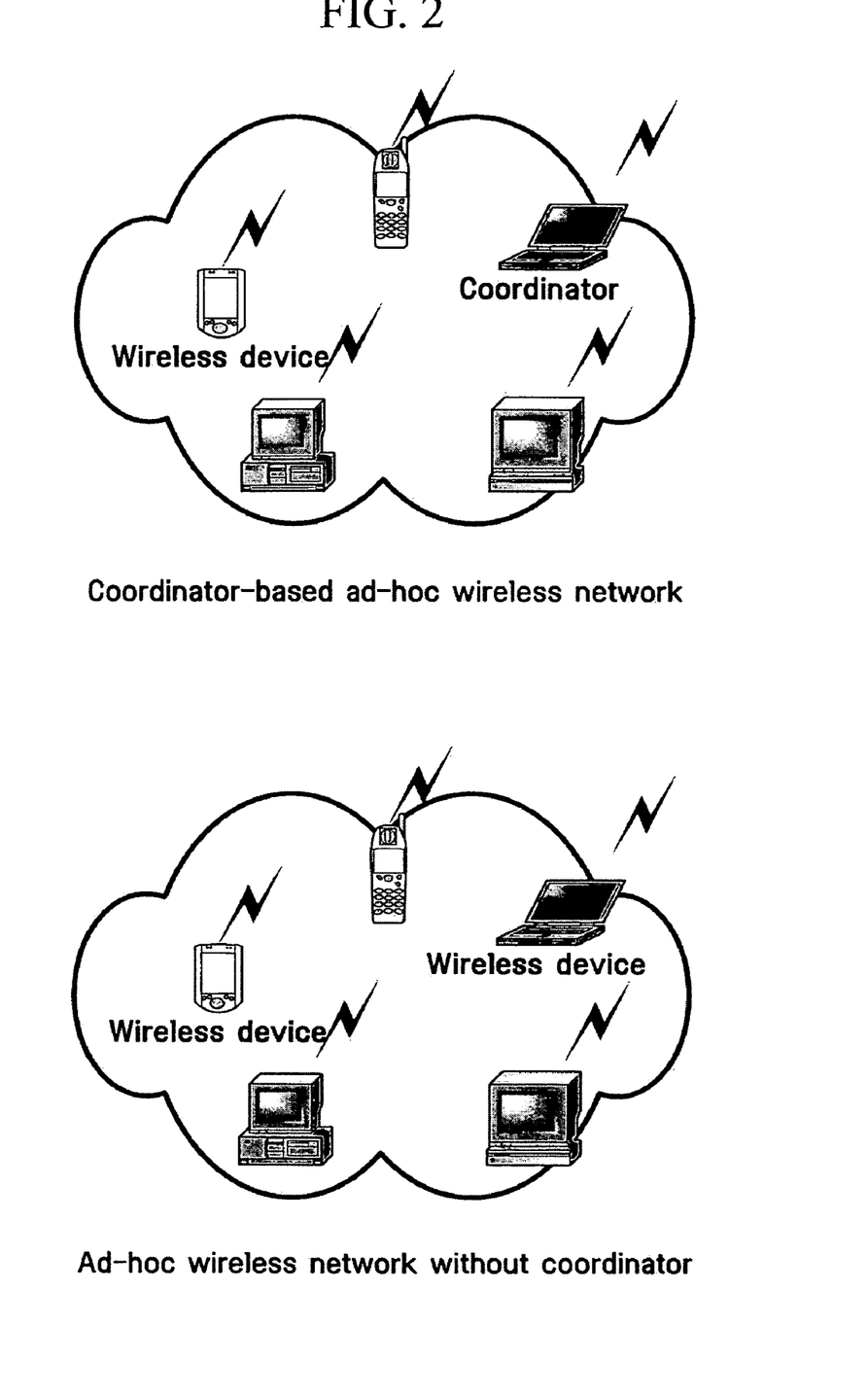
FIG. 2 is a view showing an ad-hoc mode wireless network.

Further, as shown in FIG. 2, there is another type of wireless network including no access point, which is called an ad-hoc mode wireless network.

In the infrastructure mode wireless network, an access point performs a relay function of transmitting data in order to connect a wireless network to a wired network or communication between wireless network devices belonging to a wireless network. Accordingly, all data must pass through the access point.

Next, the ad-hoc mode wireless network is formed only when a network is required without an advance plan. In the ad-hoc mode wireless network, wireless network devices belonging to a single wireless network directly exchange data with each other without passing through a connecting device such as the access point.

Such a network type may be classified into two types of networks. In a first network type, a wireless network device designated randomly from among wireless network devices belonging to a single wireless network functions as a coordinator which assigns a time period (hereinafter, referred to as a channel time), for which data can be transmitted, to the other wireless network devices. Further, the other wireless network devices can transmit data only for a determined channel time.

In a second network type, there is no wireless network device functioning as a coordinator, and all wireless network devices can transmit data whenever they are wanted to transmit data.

Herein, in the case of the former, that is, in the network type (hereinafter, referred to as a coordinator-based wireless network) in which a wireless network device functioning as a coordinator exists, an independent single wireless network is formed on the basis of the coordinator. Further, when a plurality of coordinator-based wireless networks exist in a predetermined area, each of the coordinator-based wireless networks has inherent identification information in order to be distinguished from other coordinator-based wireless networks.

Accordingly, wireless network devices belonging to a specific coordinator-based wireless network can exchange data with other wireless network devices in the specific coordinator-based wireless network for a channel time period determined by a coordinator. However, it may be impossible for the wireless network devices to communicate with network devices belonging to another type of network different from the coordinator-based wireless network, because the two different networks may support different protocols from each other.

For instance, when an IEEE 802.15.3 network is used as a coordinator-based wireless network, the IEEE 802.15.3 network uses a MAC address of eight bytes as the physical address of a network device. In addition, the IEEE 802.15.3 network converts the MAC address of eight bytes to a device ID of one byte in order to reduce an overhead of a frame. However, an IEEE 802.3 network uses a MAC address of six bytes as the physical address of a network device. Since the two networks use different physical address types of a network device, even though the two networks are interconnected through a backbone network by a wired/wireless connecting device, it is difficult for the two networks to directly communicate with each other.

Accordingly, it is necessary to construct a new network topology for exchanging data between a network device belonging to a coordinator-based wireless network and a network device connected to another type of network different from the coordinator-based wireless network.

SUMMARY OF THE INVENTION

Accordingly, the present invention has been made to solve the above-mentioned problems occurring in the prior art, and it is an object of the present invention to provide an apparatus and a method, which enable network devices connected to different types of networks to exchange data with each other by connecting a coordinator-based wireless network to a different type of network through a wired backbone.

The present invention is not limited to the aforementioned object, and other unwritten objects will become apparent to and understood by those skilled in the art through the following description.

According to one aspect of the present invention, there is provided a communication method between a coordinator-based wireless network and a different type of network interconnected through a backbone network, the communication method comprising: a) acquiring a physical address of a destination network device connected to the network different from the coordinator-based wireless network; b) generating a frame containing the physical address of the destination network device; and c) transmitting the generated frame to a connecting device connecting the coordinator-based wireless network to the backbone network According to another aspect of the present invention, there is provided a communication method between a coordinator-based wireless network and a different type of network interconnected through a backbone network, the communication method comprising: a) receiving a physical address respect frame from a connecting device connecting the coordinator-based wireless network to the backbone network; b) transmitting a physical address response frame, which contains a physical address and has been converted to an address of a type supported by a network from which the physical address respect frame has been transmitted, to the connecting device after receiving the physical address respect frame; and c) receiving the frame containing the physical address from the connecting device after transmitting the physical address response frame to the connecting device.

According to a further aspect of the present invention, there is provided a communication method between a coordinator-based wireless network and a different type of network interconnected through a backbone network, the communication method comprising: a) converting a frame received from a network device in the coordinator-based wireless network to another type of frame supported by a backbone network; b) transmitting the converted frame to the backbone network; c) converting the frame received from the backbone network to another type of frame supported by the coordinator-based wireless network; and d) transmitting the converted frame to the network device in the coordinator-based wireless network.

According to yet a further aspect of the present invention, there is provided a network device comprising: a control module for generating a physical address request frame for requesting a physical address of a destination network device connected to a network whose type is different from a coordinator-based wireless network, extracting the physical address of the destination network device from a physical address response frame, which is a response frame for the physical address request frame, and generating a frame which contains the physical address of the destination network device and has been converted to an address of a type supported by a destination network; a transceiving module for transmitting the physical address request frame generated by the control module or the frame containing the physical address of the destination network device, and receiving the physical address response frame which is a response frame for the physical address request frame; and a storage module for storing the frame generated by the control module or the frame provided from the transceiving module.

According to yet a further aspect of the present invention, there is provided a network device comprising: a control module for generating a physical address response frame, which contains a physical address of the network device and has been converted to an address whose type is supported by a network from which a physical address request frame has been transmitted, in response to the physical address request frame received from a connecting device connecting a coordinator-based wireless network including the network device to a backbone network, and for extracting the physical address of the network device from the frame containing the physical address of the network device; a transceiving module for transmitting the physical address response frame generated by the control module, and receiving the physical address request frame or the frame containing the physical address of the network device; and a storage module for storing the frame generated by the control module or the frame provided from the transceiving module.

According to still a further aspect of the present invention, there is provided a connecting device connecting a coordinator-based wireless network to a backbone network, the connecting device comprising: a transceiving module for receiving a frame from the coordinator-based wireless network to transmit the received frame to the backbone network, and receiving a frame from the backbone network to transmit the received frame to the coordinator-based wireless network; a control module for converting the frame of the coordinator-based wireless network provided from the transceiving module to another type of frame supported by the backbone network, and converting the frame of the backbone network provided from the transceiving module to another type of frame supported by the coordinator-based wireless network; and a storage module for storing the frame provided by the transceiving module or the frame converted by the control module.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings.

Advantages and features of the present invention, and methods for achieving them will be apparent to those skilled in the art from the detailed description of the embodiments together with the accompanying drawings. However, the scope of the present invention is not limited to the embodiments disclosed in the specification, and the present invention can be realized in various types. The described present embodiments are presented only for completely disclosing the present invention and helping those skilled in the art to completely understand the scope of the present invention, and the present invention is defined only by the scope of the claims. Additionally, the same reference numerals are used to designate the same elements throughout the specification and drawings.

Hereinafter, an exemplary embodiment of the present invention will be described with reference to the accompanying drawings.

In a wireless network, an institute of electrical and electronics engineers (hereinafter, referred to as an IEEE) 802.15.3 has proposed a standard regarding a PHY layer corresponding to a physical layer and a medium access control (hereinafter, referred to as a MAC) layer corresponding to a data link layer, from among an open system interconnection (OSI) 7 layer in relation to a network model published by an international standard organization (ISO).

Accordingly, for easy understanding of the present invention, a description will be given by means of an embodiment for a coordinator-based wireless network. The embodiment for the coordinator-based wireless network is based on a wireless personal area network (hereinafter, referred to as a WPAN) conforming to an IEEE 802.15.3 standard, and connects another type of network different from a coordinator-based wireless network by means of using a wired backbone on the basis of a MAC layer. Accordingly, a network system can be achieved in which data can be exchanged between network devices belonging to different types of networks.

Figure 3:
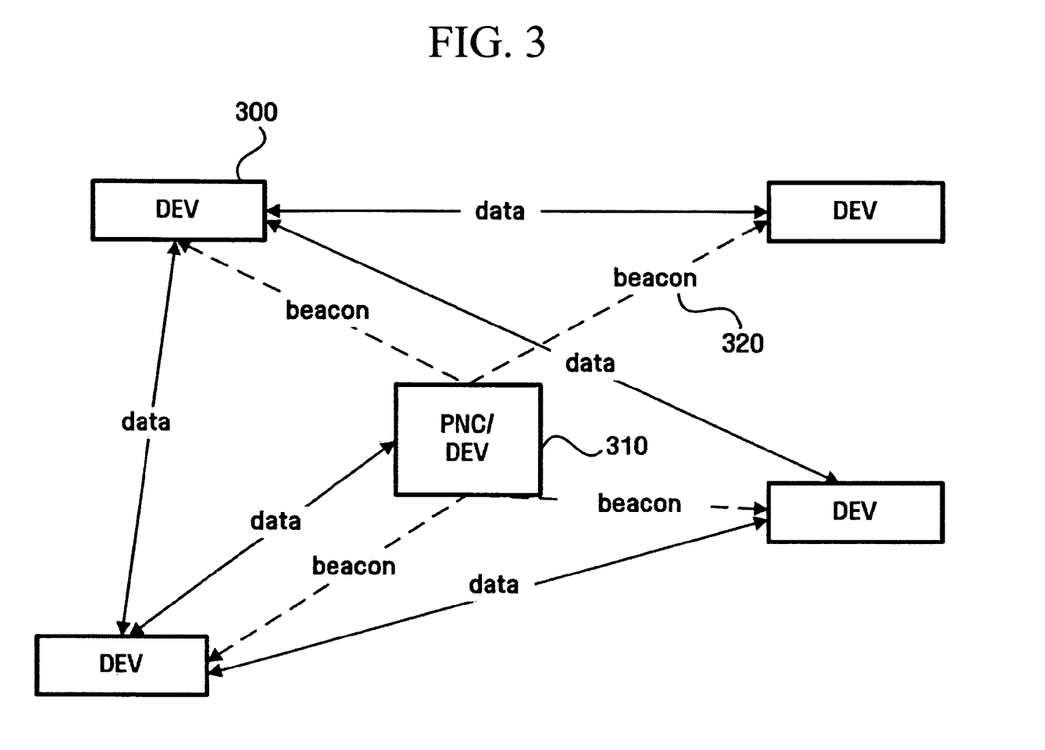
FIG. 3 is a block diagram showing a construction of a general WPAN according to an IEEE 802.15.3 standard specification.

FIG. 3 is a block diagram showing a construction of a general WPAN according to an IEEE 802.15.3 standard specification.

An ultra wideband (UWB) is a radio technology for transmitting a large quantity of digital data with low power over a short distance through a wide spectrum frequency, and a radio technology developed for military purposes by the US Department of Defense. Such standardization for the ultra wideband is currently being performed by an IEEE 802.15.3, that is, a working group for establishing a WPAN standard. The IEEE 802.15.3 deals with a PHY and a MAC, and research into an improvement method of the MAC even between the PHY and the MAC has been actively developed by the industry.

An IEEE 802.15.3 MAC has a characteristic in which the formation of a wireless network is quick. Further, the IEEE 802.15.3 MAC is not based on an access point but an ad-hoc network called a piconet based on a coordinator called a piconet coordinator.

A piconet is a wireless ad-hoc data communication system which allows multiple independent data devices to communicate with each other. Piconets are different from other types of data networks in that data communication is generally limited to a small area around a person or a thing. A piconet typically encompasses an area within a radius of about 10 m around a person or a thing, which may be in a motionless state or a moving state.

As shown in FIG. 3, a piconet according to an IEEE 802.15.3 standard specification includes multiple elements, and a basic element is a device 300. One device is required to function as a piconet coordinator. A piconet coordinator 310 provides a basic timing for a piconet by means of a beacon frame 320 containing information on the piconet. Further, a piconet coordinator manages a requirement condition for quality of service (QoS), a power saving mode, and an access control regarding a piconet.

A piconet is formed when a 802.15.3 device capable of acting as a piconet coordinator starts to transmit a beacon frame. Accordingly, even when there is no coupled device, a piconet coordinator sending a beacon frame is considered to be one piconet.

When data to be transmitted exist, each device of a piconet requests a channel time allocation (CTA) from a piconet coordinator. Then, the piconet coordinator allocates a channel time to the devices having requested the channel time allocation and broadcasts a beacon frame containing channel time allocation information to all devices. The devices having received the beacon frame containing the channel time allocation information transmit already stored data frames to a destination device when channel times allocated to the devices arrive.

Hereinafter, terms defined in a WPAN are used for the unification of terms.

Figure 4:
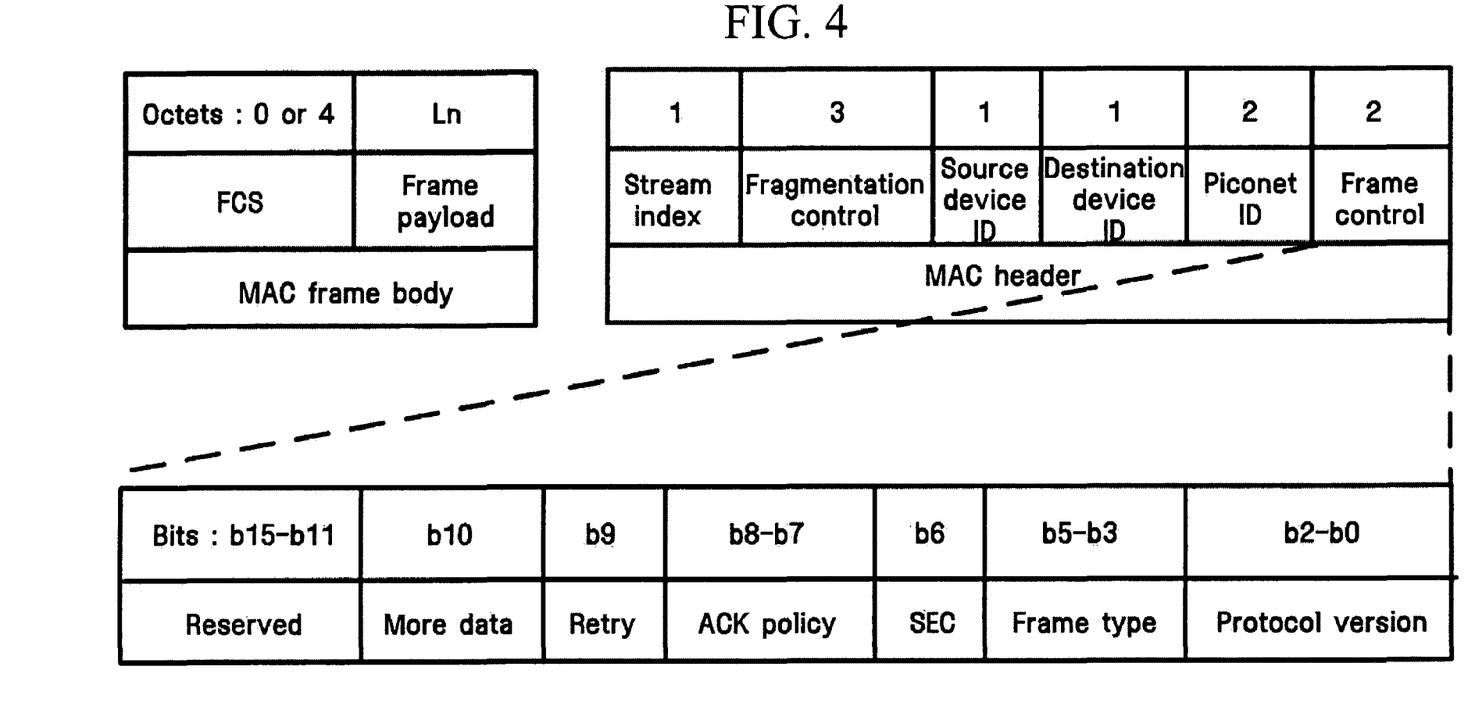
FIG. 4 is a view showing a structure of a general frame according to an IEEE 802.15.3 standard specification.

FIG. 4 is a view showing a structure of a general MAC frame according to an IEEE 802.15.3 standard specification.

A MAC frame form in FIG. 4 includes a set of fields shown in a fixed sequence in all frames. Each MAC frame basically includes a MAC header and a MAC frame body. The MAC frame body includes a frame payload having a variable length and a frame check sequence (FCS).

Hereinafter, the construction of the MAC header will be described.

First, a frame control field includes a protocol version, a frame type, an SEC, an ACK policy, a retrial, more data, and reserved fields.

A protocol version field includes protocol version information of a 802.15.3 standard. When a frame having a protocol version higher than that supported by a device is received, the received frame may be discarded without informing a source device of the reception of the frame.

A frame type field represents the type of a transmitted frame. The frame type is shown in the following table.

| Type value b5 b4 b3 | Frame type description |
|---|---|
| 000 | Beacon frame |
| 001 | Immediate ACK frame |
| 010 | Delayed ACK frame |
| 011 | Command frame |
| 100 | Data frame |
| 101-111 | Reserved |

An SEC bit is set to have a value of 1 when the frame body is protected by a security ID (SECID) by means of a specific key. Otherwise, the SEC bit is set to have a value of 0. Herein, frames containing an SEC bit set to have a value of 1 use a security frame type. An ACK policy field is used for showing a type of a confirmation procedure required to be performed by a receiver. A retrial bit is set to have a value of 1 when a frame is a data frame or command frame for retransmitting an already transmitted frame. Further, the retrial bit is set to have a value of 0 in other frames. A more data bit is set to have a value of 0 when a device does not use the other channel time of a channel time allocation. Further, the more data bit is set to have a value of 0 in the last frame of an expansion beacon and a beacon frame which is not a part of the expansion beacon. In the other all cases, the more data bit is set to have a value of 1. This includes frames (except for the last frame) which are a part of the expansion beacon.

Next, a piconet ID (PNID) field includes a unique identifier for a piconet. The piconet ID is usually unchanged during a current instantiation of a piconet and can be maintained during a series of multiple instantiations of a piconet by the same piconet coordinator. The piconet ID is set to be the current piconet ID for a piconet and is used for identifying frames from devices of the piconet.

The MAC frame form includes two device ID fields. These fields are used for representing a source device ID (SrcID) and a destination device ID (DestID). The device ID is unique for a device coupled to one piconet. In the IEEE 802.15.3 standard specification, in order to reduce the overhead of a frame, the physical address of a device uses a device ID of one byte allocated by a piconet coordinator instead of a MAC address of eight bytes.

Herein, the physical address is a kind of address of a network device on a network and represents a hardware-dependent address. Since the physical address is a hardware-dependent address, a physical address of each network device is unique within an entire network. In the case of WPAN conforming to the IEEE 802.15.3 standard, the MAC address of a device corresponds to a physical address.

A logical address, in contrast with the physical address, is an address necessary for providing a general communication service regardless of a base physical network. Since it is unsuitable that other networks use a physical address of a network device in network environments having a different address form, a general address system is required, which enables network devices to be specifically identified from each other regardless of a base physical network. One example of such a logical address is an IP address.

A fragmentation control field is used for helping a fragmentation and a recombination of a MAC service data unit (MSDU) and a command frame.

The frame payload field of the frame body is a field which has a variable length and contains information transmitted to a device or a device group of a piconet. Further, a frame check sequence field includes a 32-bit CRC.

Figure 5:
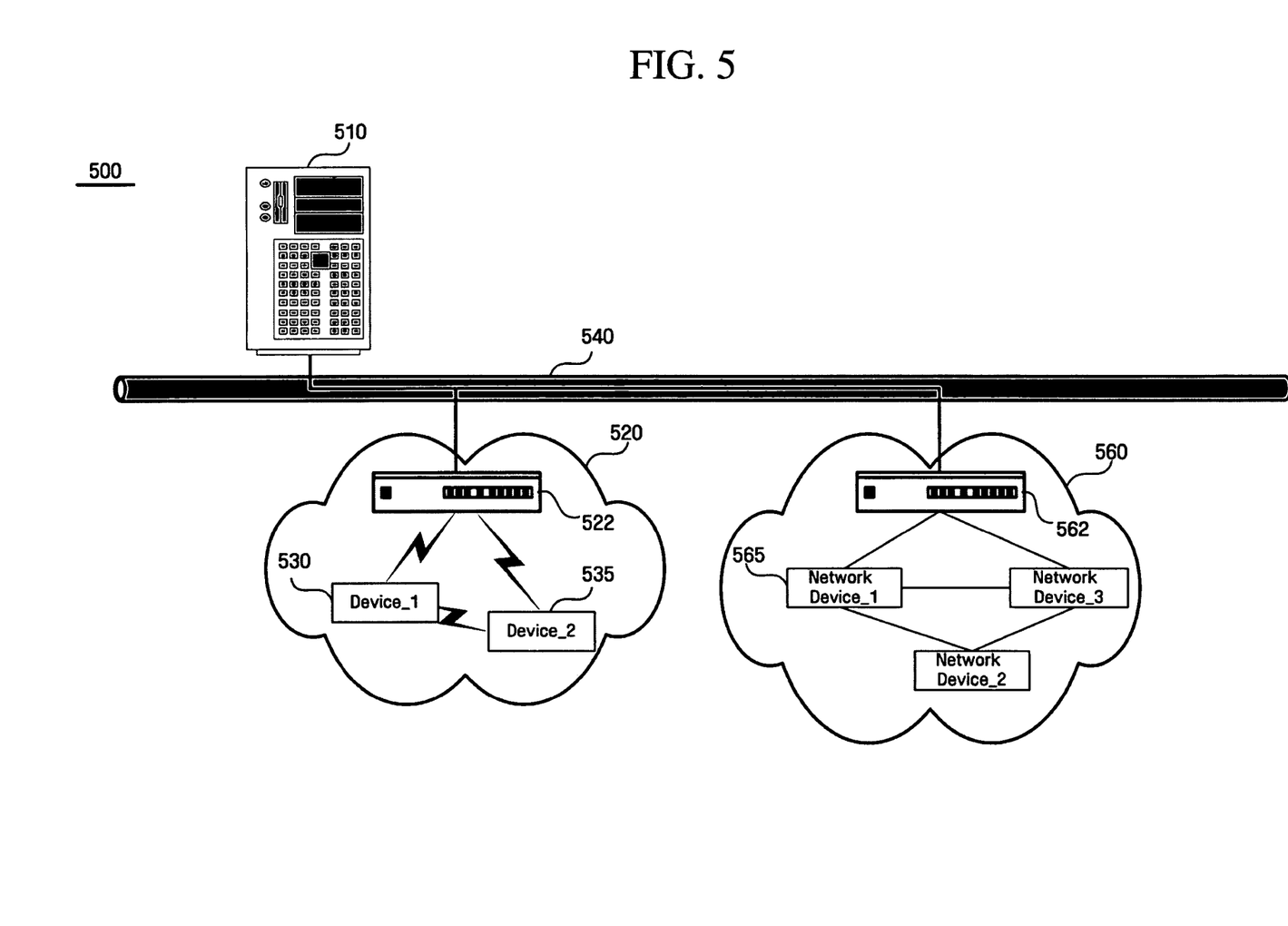
FIG. 5 is a view showing a structure of a WPAN and an 802.3 network, a network different from the WPAN, according to an embodiment of the present invention, which are interconnected through a backbone network by means of a wired/wireless connecting device.

FIG. 5 is a view showing a structure of a WPAN and a different type of network (i.e., 802.3 network) according to one embodiment of the present invention, which are interconnected through a backbone network by means of a wired/wireless connecting device.

Generally, networks different from a coordinator-based wireless network may include various networks such as IEEE 802.11 wireless networks and Ethernets. In order to help easy understanding of the present invention, a description based on an IEEE 802.3 network will be given hereinafter.

An IEEE 802.3 is a standard of an Ethernet and is used in a local area network (LAN) employing a carrier sense multiple access/collision detection (CSMA/CD) method. An IEEE 802.3 has a concept nearly identical to an Ethernet.

A network system 500 may include one piconet 520, one 802.3 network 560, a wired network 540 connected to the piconet 520 and the 802.3 network 560, a gateway 510 connected to the wired network 540, and connecting devices 522 and 562 connecting the piconet 520 and the 802.3 network 560 to the wired network 540. Herein, in order to clearly identify the connecting devices 522 and 562 from each other, the connecting device 522 belonging to the piconet 520 is called a first connecting device and the connecting device 562 belonging to the 802.3 network 560 is called a second connecting device. Herein, the connecting device may include a router, a wired/wireless bridge, a device, or a piconet coordinator according to a network topology. For instance, when the connecting device is a wired/wireless bridge, the network system 500 forms an IP subnet such as a 192.168.9.x. In the embodiment of the present invention, a wired/wireless bridge is used as a connecting device of a wired/wireless network.

Meanwhile, the wired network 540 can conform to any type of wired network protocol based on a medium, which enables communication, such as a coaxial cable, an optical cable, a power line, a telephone line, etc. Herein, physical environments to which the present invention is applied to determine a wired network protocol to which the wired network 540 must conform.

According to an exemplary embodiment of the present invention, for instance, in order for a device 530 to communicate with a device 535, that is, when communication is accomplished in the same piconet, the device 530 and the device 535 have only to conform to the conventional IEEE 802.15.3 standard. However, in order for the device 530 to communicate with a device 565 belonging to the 802.3 network 560, the device 530 generates a wireless packet, which contains information used in solving difference between an IEEE 802.15.3 standard and an IEEE 802.3 standard, and transmits the generated wireless packet to the connecting device 522. Then, the connecting device 522 converts the wireless packet into another type of packet supported by a final destination network by means of the information contained in the wireless packet, and generates a wired packet having a structure capable of being transmitted by a wired backbone, because a communication protocol structure may change according to a transmission medium characteristic and a packet structure may change according to the changed communication protocol structure. The wired packet generated by the first connecting device 522 is transmitted to the second connecting device 562 through the wired network 540. Herein, the wired packet may be transmitted from the first connecting device 522 to the second connecting device 562 by a broadcast transmission method or a multicast transmission method. In addition, the wired packet may be directly transmitted to only the second connecting device 562 by a predetermined method.

The second connecting device 562 converts the wired packet received from the first connecting device 522 into a packet conforming to an IEEE 802.3 standard again, and then transmits the converted packet to the network device 565.

Herein, a response process for the packet transmitted from the device 530 is as follows. That is, the network device 565 generates a response packet conforming to an IEEE 802.3 standard to transmit the response packet to the second connecting device 562. Then, the second connecting device 562 converts the received packet to a packet, which can be supported by the wired backbone, and transmits the converted packet to the first connecting device 522. Then, the first connecting device 522 receives the packet from the wired backbone, converts the received packet to a packet conforming to an IEEE 802.15.3 standard, and transmits the converted packet to the device 530.

Meanwhile, a WPAN uses a MAC address of eight bytes as the physical address of a device. However, in order to reduce the overhead of a frame, a WPAN uses a unique device ID of one byte allocated by a piconet coordinator in a combination between devices as the physical address of a device, instead of a MAC address of eight bytes. In contrast, an 802.3 network uses a MAC address of six bytes as the physical address of a network device. Accordingly, in order to perform communication between the WPAN and the 802.3 network interconnected through the wired backbone, it is necessary to convert a frame form supported by the WPAN. A method for converting the frame will be described in detail with reference to FIG. 6.

Figure 6:
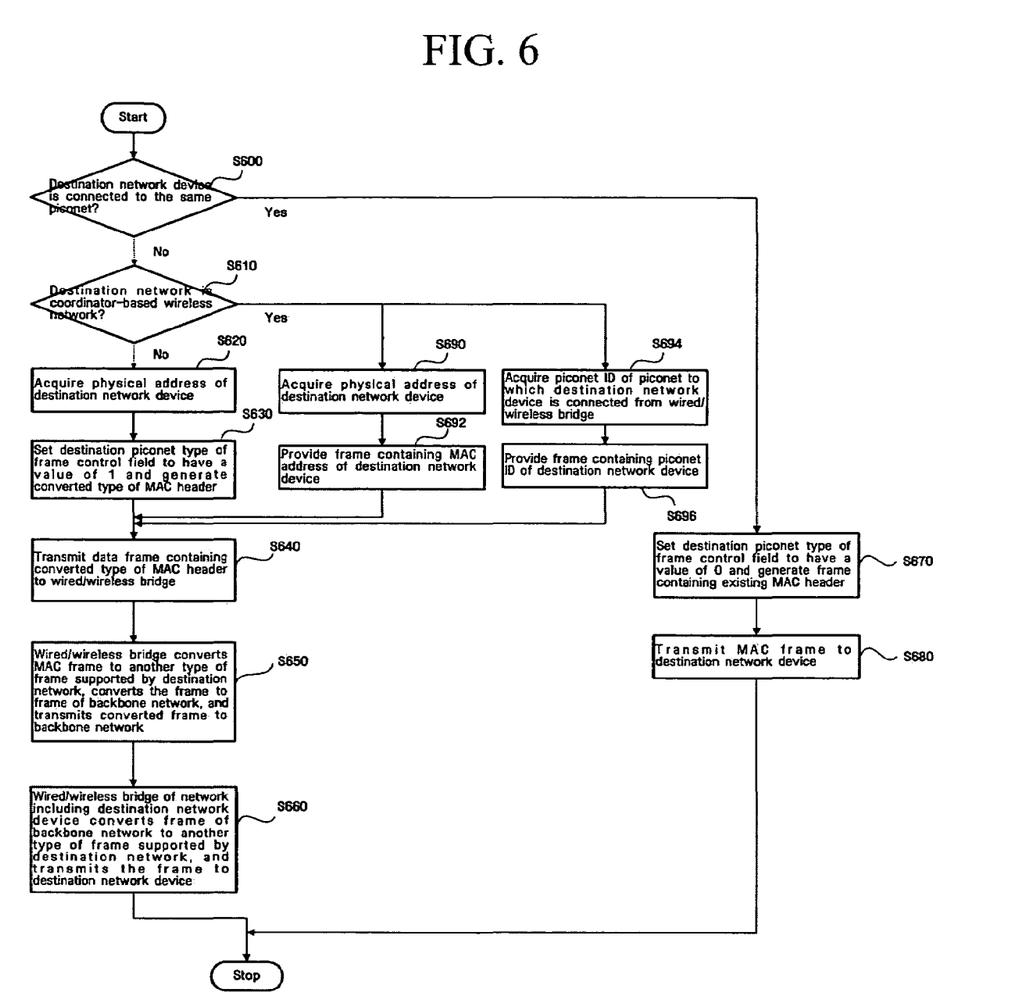
FIG. 6 is a flowchart illustrating a communication method between a WPAN and an 802.3 network, a network different from the WPAN, according to an embodiment of the present invention, which are interconnected through a backbone network.

FIG. 6 is a flowchart illustrating a communication method between a WPAN and a different type of network (i.e., 802.3 network) according to one embodiment of the present invention, the WPAN and other network being interconnected through a backbone network.

A source network device operates as follows. First, the source network device asks a piconet coordinator whether or not a destination network device is connected to the same piconet (S600). Herein, when the destination network device belongs to the same piconet, the source network device sets a destination network type 710 of a frame control field of FIG. 7A to have a value of 0 and generates a frame including a MAC header conforming to the conventional 802.15.3 standard shown in FIG. 4 (S670). Then, the source network device receives a channel time allocated by the piconet coordinator and transmits the MAC frame to the destination network device (S680).

In contrast, when the destination network device does not belong to a piconet to which the source network device belongs, the source network device acquires information on whether or not a destination network is a coordinator-based wireless network such as a piconet. When the destination network is not a coordinator-based wireless network, the source network device acquires the physical address of the destination network device (S620). Herein, information regarding a network type and information regarding a length of a physical address according to a network type may be stored in and managed by a wired/wireless connecting device or a network device.

Figure 7A:
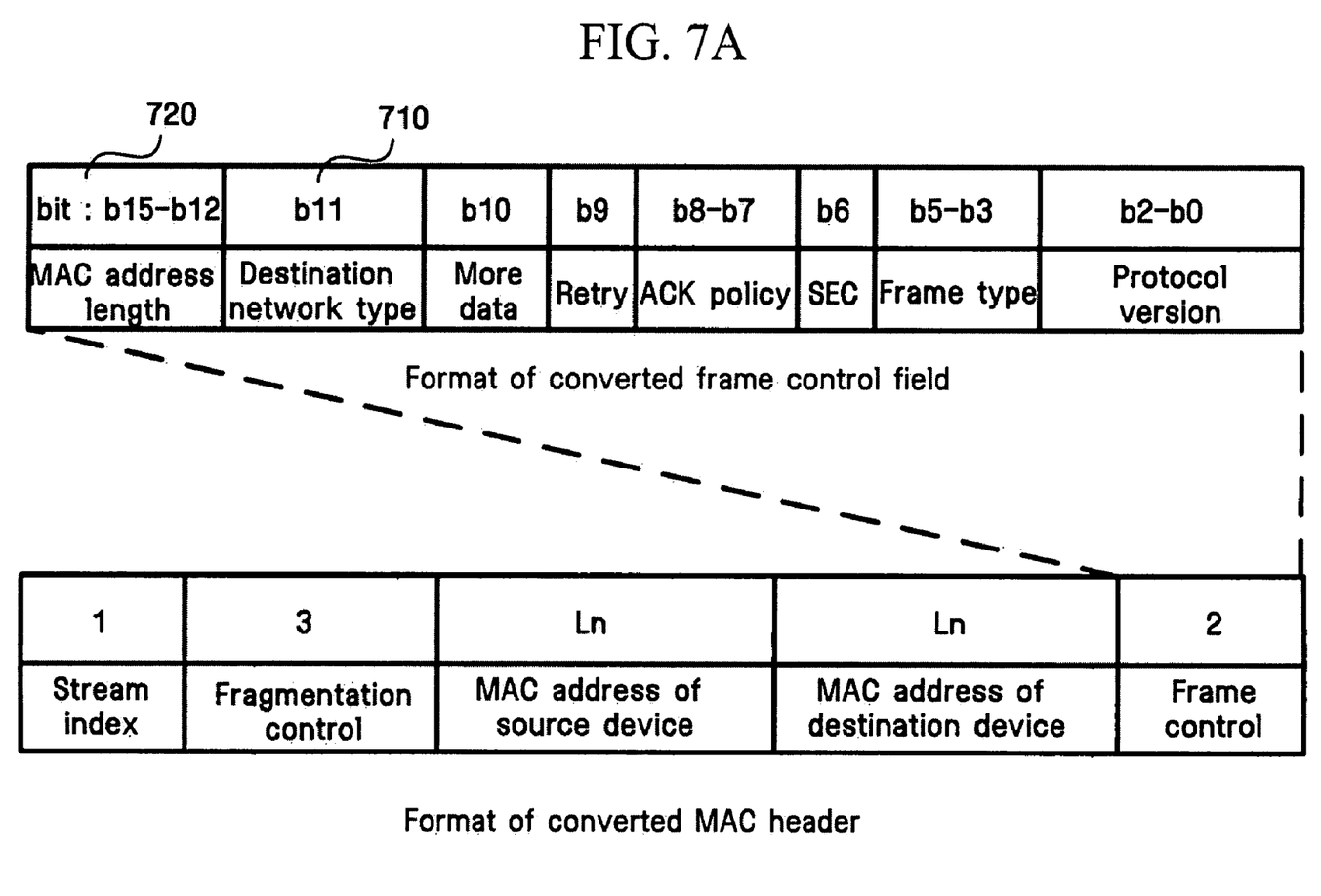
FIGS. 7A and 7B are views showing a structure of a converted frame containing a MAC address according to one embodiment of the present invention, which is a physical address of a network device and has been converted to an address of a type supported by a destination network.

As described above, the source network device acquires the physical address of the destination network device (S620). After acquiring the physical address, the source network device sets the destination network type of the frame control field to have a value of 1, and sets a length of a physical address supported by the destination network. Further, as shown in FIG. 7A, the source network device generates a MAC address of a source device and a MAC address of a destination device, which have been converted to addresses of the types supported by the destination network and used as the physical address of the network device instead of a source device ID and a destination device ID. Then, the source network device generates a converted type of MAC header containing the frame control field and the MAC addresses of the source device and the destination device (S630). Then, the source network device receives the channel time allocated by the piconet coordinator and transmits a MAC frame including the converted type of MAC header to a wired/wireless bridge (S640). A structure of the converted type of MAC frame will be described in detail with reference to FIGS. 7A and 7B later. The destination piconet type described in the embodiment may have a value of 0 or 1. Further, since this value is only one embodiment of the present invention, it is possible to use values which enable the destination piconet types to be distinguished from each other.

Meanwhile, the step (S620) in which the source network device acquires the physical address of the destination network device may be described in detail as follows. One embodiment of a mechanism for acquiring the physical address of the destination network device may use an address resolution protocol (hereinafter, referred to as an ARP) mechanism. One embodiment of the ARP mechanism includes an ARP protocol provided in an IP layer of a TCP/IP protocol. In an embodiment of the present invention, it is assumed that an IP layer is used as an upper layer of an 802.15.3 network.

Since the source network device knows an IP address, which is a logical address of the destination network device belonging to a different type of network, but does not know the physical address of the destination network device, the source network device broadcasts a frame (i.e., an ARP request frame) for requesting a physical address corresponding to the IP address of the destination network device. The destination network device receives the broadcasted frame and transmits an ARP response frame containing its own physical address to the source network device in response to the reception of the frame.

Here, an 802.15.3 network including the source network device uses a MAC address of eight bytes, which is a physical address, and an 802.3 network including the destination network device uses a MAC address of six bytes, which is a physical address. Accordingly, the source network device generates and broadcasts the ARP request frame, which contains the IP address of the source network device, the IP address of the destination network device, and physical addresses of the types supported by the destination network, such as the MAC address of the source network device, which has been converted to have a length of six bytes, and a MAC address field of the destination network device, which has a length of six bytes.

Then, the wired/wireless bridge in the network including the source network device receives the broadcasted ARP request frame, converts the ARP request frame to another type of frame supported by the backbone network, and transmits the converted frame to the backbone network. Then, a wired/wireless bridge in the network including the destination network device receives the ARP request frame, converts the received frame to another type of frame supported by the destination network, and transmits the converted frame to the destination network device. Then, the destination network device receives the frame from the wired/wireless bridge, generates the ARP response frame containing its own physical address, and transmits the ARP response frame to the source network device. The source network device extracts the MAC address of the destination network device from the ARP response frame transmitted from the destination network device.

The wired/wireless bridge having received the MAC frame from the source network device converts the received MAC frame to a frame that can be supported by the destination network, by means of the destination network type and MAC address length information contained in the MAC frame. Then, the wired/wireless bridge converts the frame to a frame that can be supported by a protocol of the backbone network, and transmits the converted frame to the wired backbone network (S650).

The wired/wireless bridge of the destination network converts the frame received from the backbone network to a frame supported by the destination network (e.g., IEEE 802.3) and transmits the converted frame to the destination network device(S660).

Meanwhile, when a destination network device does not belong to a piconet to which a source network device belongs and a destination network is a network (e.g., piconet) being the same type as that of a network including the source network device, several methods may be used for preventing the IDs of devices belonging to two piconets from overlapping with each other. In one embodiment of the present invention, the MAC address of a destination device is acquired (S690) and then a frame, which contains MAC addresses instead of device IDs as physical addresses of a source network device and the destination network device, can be provided (S692). In another embodiment of the present invention, inherent identification information, for instance, a piconet ID, is assigned to a plurality of piconets, the piconet ID of a destination device is acquired from a wired/wireless bridge in a network to which a source device belongs (S694), and a frame, which uses a combination of a piconet ID and a device ID as the physical address of the destination device, can be provided (S696).

Meanwhile, the above embodiment employs an ARP mechanism performed on an IP layer as a mechanism for acquiring the physical address of a destination device. However, this mechanism is only one embodiment of the present invention and it is clearly understood by those skilled in the art that various mechanisms capable of acquiring the physical addresses of devices by means of a frame for requesting the physical address of a destination device and a physical address response frame containing the physical address of the destination device can be employed. Further, a MAC address used as the physical address of a device has mainly been described, but this is only one embodiment of the present invention. In addition, the physical address of a device can be variously changed according to physical environments of a network.

Figure 7B:
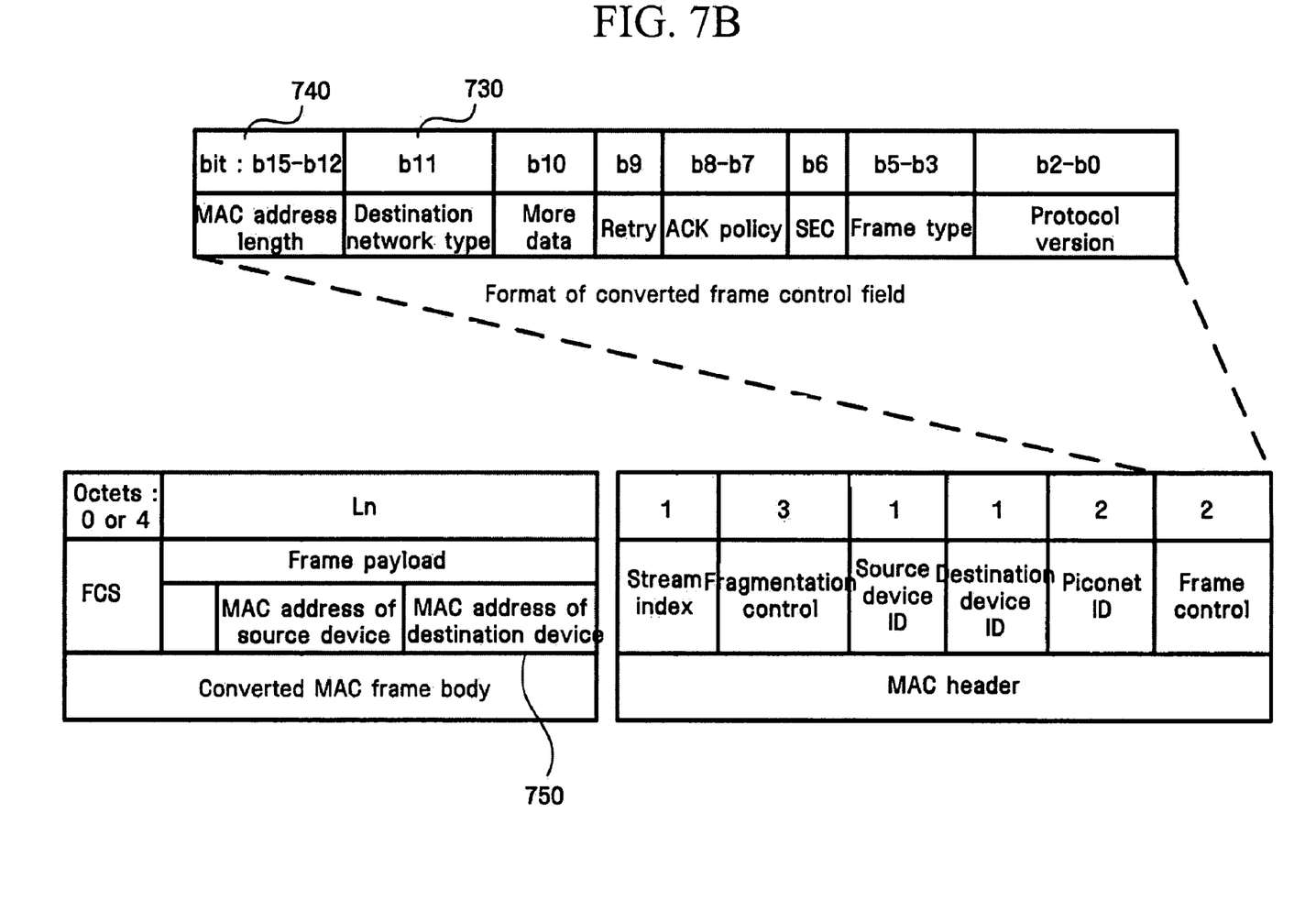

FIGS. 7A and 7B are views showing a structure of a converted frame containing a MAC address according to one embodiment of the present invention, which is the physical address of a network device and has been converted to an address of a type supported by a destination network.

In performing a communication mechanism as shown in FIG. 6, a frame conforming to the conventional IEEE 802.15.3 standard has an insufficient structure. Accordingly, in order to perform the present invention, it is necessary to modify the structure of the frame conforming to the conventional IEEE 802.15.3 standard. Further, the modification of the frame structure may change according to the kinds of connecting devices 522 and 562. Herein, the present invention uses wired/wireless bridges as the connecting devices 522 and 562 and proposes a new frame structure according to the use of the wired/wireless bridges.

In FIG. 7A, one reserved bit 710 of a frame control field of a MAC header represents a destination network type. A plurality of reserved bits 720 represent the length of a physical address (e.g., MAC address) supported by a destination network. When a network including a destination network device is a different type from that of a coordinator-based wireless network, a destination network type field is set to have a value of 1 and a MAC address length field is set to be the length of the physical address supported by the destination network. In contrast, when the network including the destination network device is the same type as that of the coordinator-based wireless network, the destination network type field is set to have a value of 0 and the MAC address length field is not used or is set to be the length of a MAC address supported by the coordinator-based wireless network. Further, the destination network type described in the embodiment may have a value of 0 or 1. However, since this value is only one embodiment of the present invention, it is possible to use values which enable the destination network types to be distinguished from each other.

When the destination network type has a value of 0, the frame structure shown in FIG. 4 conforming to the conventional IEEE 802.15.3 standard is used as is. In contrast, when the destination network type has a value of 1, the frame structure conforming to the conventional IEEE 802.15.3 standard is modified. That is, a MAC address of a source network device and a MAC address of a destination network device, which have been converted to addresses of types supported by the destination network, are used instead of a source network device ID and a destination network device ID of a MAC header. Here, the converted MAC address of the source network device may contain a resultant by converting a source device ID to the length of the physical address supported by the destination network.

In another embodiment of the present invention for a new frame structure, as shown in FIG. 7B, MAC addresses of a source network device and a destination network device, which have been converted to addresses of types supported by the destination network, may be inserted into not a MAC header but a payload of a frame body. Herein, one reserved bit 730 of the frame control field of the MAC header is used as a bit representing a destination network type and the reserved bits 740 represent the length of a physical address (e.g., MAC address) supported by a destination network, similar to the embodiment of FIG. 7A. However, only when the destination network type has a value of 1, the MAC addresses of the source network device and the destination network device, which have been converted to the type supported by the destination network, may be inserted into the payload of the frame body as a part 750 of data.

Figure 8:
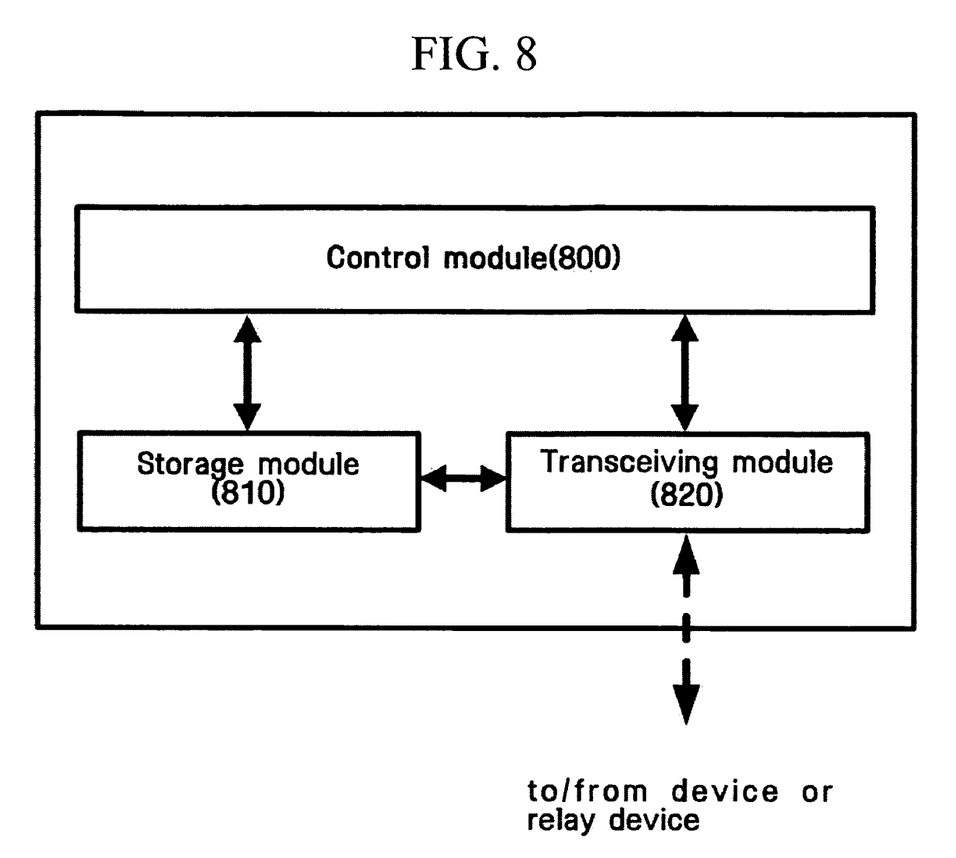
FIG. 8 is a block diagram showing a structure of a wireless network device according to one embodiment of the present invention.

FIG. 8 is a block diagram showing a structure of a wireless network device according to one embodiment of the present invention.

The wireless device according to one embodiment of the present invention includes a control module 800, a transceiving module 820, and a storage module 810.

The term "module" used in the present embodiment represents a software element or a hardware element, such as a field programmable gate-array (FPGA) or an application-specific integrated circuit (ASIC), and the module performs a predetermined role. However, the module is not limited to software or hardware. Further, the module may be constructed to exist in an addressable storage module, or to reproduce one or more processors. For instance, the module includes elements (e.g., software elements, object-oriented software elements, class elements and task elements), processors, functions, properties, procedures, subroutines, segments of a program code, drivers, firmware, a microcode, a circuit, data, a database, data structures, tables, arrays, and variables. Herein, functions provided by elements and modules may be provided either by a smaller number of combined larger elements and combined larger modules or by a larger number of divided smaller elements and divided smaller modules. In addition, elements and modules may be realized to reproduce a device or one or more CPUs in a device.

In the case of a source network device, when a destination network device belongs to another type of network different from a coordinator-based wireless network including a source network device, the control module 800 generates a physical address request frame in order to acquire the physical address of the destination network device, extracts the physical address of the destination network device from a physical address response frame received as a response of the physical address request frame, and generates a frame containing the physical address of the destination network device.

The transceiving module 820 transmits the physical address request frame generated by the control module 800 or the frame containing the physical address of the destination network device, and receives the physical address response frame which is a response for the physical address request frame.

The storage module 810 stores the frame generated by the control module 800 or the frame received from the transceiving module.

In the case of the destination network device, the control module 800 generates the physical address response frame, which contains the physical address of the destination network device and has been converted to a type supported by the network from which the physical address request frame has been transmitted, in response to the physical address request frame received from a connecting device which connects a coordinator-based wireless network including the destination network device to a backbone network. Further, the control module 800 extracts the physical address of the destination network device from the frame containing the physical address of the destination network device.

The transceiving module 820 transmits the physical address response frame generated by the control module 800, and receives the physical address request frame or the frame containing the physical address of the destination network device.

The storage module 810 stores the frame generated by the control module 800 or the frame received from the transceiving module.

Figure 9:
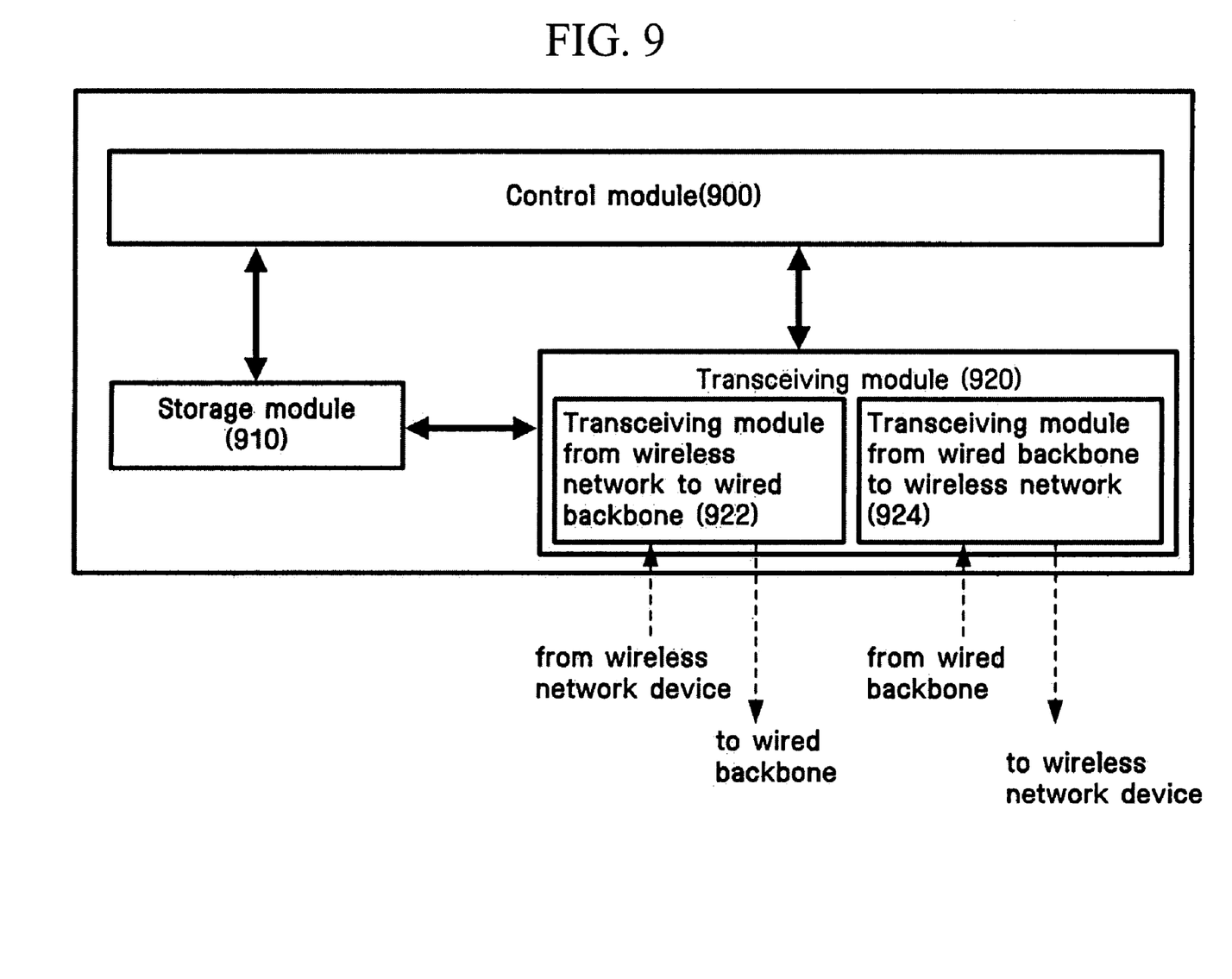
FIG. 9 is a block diagram showing a structure of a wired/wireless connecting device according to one embodiment of the present invention.

FIG. 9 is a block diagram showing a structure of a wired/wireless connecting device according to one embodiment of the present invention.

The wired/wireless connecting device includes a control module 900, a transceiving module 920, and a storage module 910.

The transceiving module 920 includes a first transceiving module 922 and a second transceiving module 924. The first transceiving module 922 receives a frame from a coordinator-based wireless network to transmit the received frame to a backbone network. The second transceiving module 924 receives a frame from the backbone network to transmit the received frame to the coordinator-based wireless network.

The control module 900 converts the frame of the coordinator-based wireless network provided from the transceiving module to another type of frame supported by the backbone network, and converts the frame of the backbone network provided from the transceiving module to another type of frame supported by the coordinator-based wireless network. Specifically, the control module 900 converts the frame of the coordinator-based wireless network provided from the transceiving module to the frame supported by the destination network according to destination network type information and information regarding a length of a physical address (e.g., MAC address) supported by the destination network, which are contained in the frame. Then, the control module 900 converts the frame to the frame which can be supported by the backbone network again. In addition, the control module 900 converts the frame of the backbone network provided from the transceiving module to the frame which can supported by the coordinator-based wireless network.

The storage module 910 stores the frame provided by the transceiving module or the frame converted by the control module, because, when frames, which can be transmitted at one time from the coordinator-based wireless network and the backbone network, have sizes different from each other, it is necessary to adjust the sizes and temporarily store the frames for conversion between frame types supported by the coordinator-based wireless network and the backbone network. Also, the storage module 910 stores the identification information of the coordinator-based wireless network managed by the control module.

As described above, according to a method and an apparatus for communication between a coordinator-based wireless network and a different type of network interconnected through a backbone network, communication is performed between the coordinator-based wireless network and another type of network different from the coordinator-based wireless network, thereby expanding the communication area of the coordinator-based wireless network. The methods according to exemplary embodiments of the present invention as described above can also be embodied as a program stored on a computer readable recording medium Exemplary embodiments of the present invention have been described for illustrative purposes, and those skilled in the art will appreciate that various modifications, additions and substitutions are possible, without departing from the scope and spirit of the invention as disclosed in the accompanying claims.

A computer readable recording medium storing a program can be used to perform an above-described method, according to an exemplary embodiment of the present invention. For example, a computer readable recording medium storing a program can be used to perform a communication method between a coordinator-based wireless network and a different type of network interconnected through a backbone network. The communication method can comprise: a) acquiring a physical address of a destination network device connected to the network different from the coordinator-based wireless network; b) generating a first frame containing the physical address of the destination network device; and c) transmitting the generated first frame to a connecting device connecting the coordinator-based wireless network to the backbone network The computer readable recording medium storing a program can also be used to perform a communication method between a coordinator-based wireless network and a different type of network interconnected through a backbone network. The communication method can comprise: a) receiving a physical address request frame from a connecting device connecting the coordinator-based wireless network to the backbone network; b) transmitting a physical address response frame, which contains a physical address and has been converted to an address whose type is supported by a network from which the physical address request frame has been transmitted, to the connecting device after receiving the physical address request frame; and c) receiving a frame containing the physical address from the connecting device after transmitting the physical address response frame to the connecting device.

What is claimed is:

1. A communication method between a coordinator-based wireless network and a different type of destination network interconnected through a backbone network, the communication method comprising:
   a) acquiring a physical address of a destination network device connected to the network different from the coordinator-based wireless network;
   b) generating a first frame containing the physical address of the destination network device; and
   c) transmitting the generated first frame to a connecting device connecting the coordinator-based wireless network to the backbone network,
   wherein the step a) comprises:
   transmitting a second frame for requesting the physical address of the destination network device;
   receiving a physical address response frame containing the physical address of the destination network device from the connecting device after transmitting the second frame for requesting the physical address; and
   extracting the physical address of the destination network device from the physical address response frame.

2. The communication method of claim 1, wherein the second frame for requesting the physical address includes at least one of a logical address of a source network device, a logical address of the destination network device, and a physical address of the source network device, which are supported by the destination network.

3. The communication method of claim 1, wherein the first frame containing the physical address includes a frame body portion containing data to be transmitted and a header portion containing information about the data to be transmitted, and the header portion contains information regarding at least one of a type of the destination network, information regarding a physical address length of the destination network device supported by the destination network, and a physical address of a source network device and the physical address of the destination network device supported by the destination network.

4. The communication method of claim 1, wherein the first frame containing the physical address includes a frame body portion containing data to be transmitted and a header portion containing information about the data to be transmitted, the header portion contains at least one of information regarding a type of the destination network and information regarding a physical address length of the destination network device which is of a type supported by the destination network, and the frame body portion contains at least one of a physical address of a source network device and the physical address of the destination network device supported by the destination network.

5. A communication method between a coordinator-based wireless network and a different type of network interconnected through a backbone network, the communication method comprising:
  a) receiving a physical address request frame from a connecting device connecting the coordinator-based wireless network to the backbone network;
  b) transmitting a physical address response frame, which contains a physical address and has been converted to an address whose type is supported by the different type of network from which the physical address request frame has been transmitted, to the connecting device after receiving the physical address request frame; and
  c) receiving a frame containing the physical address from the connecting device after transmitting the physical address response frame to the connecting device.

6. The communication method of claim 5, wherein c) comprises:
  converting the frame containing the physical address to a frame supported by the coordinator-based wireless network; and
  processing the converted frame.

7. A network device comprising:
  a control module for generating a physical address request frame for requesting a physical address of a destination network device connected to a destination network whose type is different from a coordinator-based wireless network, extracting the physical address of the destination network device from a physical address response frame, which is a response frame based on the physical address request frame, and generating a frame which contains the physical address of the destination network device, wherein said physical address is converted to an address of a type supported by the destination network;
  a transceiving module for transmitting one of the physical address request frame generated by the control module and the frame containing the physical address of the destination network device, and receiving the physical address response frame which is a response frame based on the physical address request frame; and
  a storage module for storing one of the frame generated by the control module and the physical address response frame provided from the transceiving module.

8. The network device of claim 7, wherein the frame containing the physical address of the destination network device includes a frame body portion containing data to be transmitted and a header portion containing information about the data to be transmitted, and the header portion contains information regarding a type of the destination network, information regarding a physical address length of the destination network device supported by the destination network, and a physical address of the network device and the physical address of the destination network device supported by the destination network.

9. The network device of claim 7, wherein the frame containing the physical address of the destination network device includes a frame body portion containing data to be transmitted and a header portion containing information about the data to be transmitted, the header portion contains information regarding a type of the destination network and information regarding a physical address length of the destination network device supported by the destination network, and the frame body portion contains a physical address of the network device and the physical address of the destination network device supported by the destination network.

10. A network device comprising:
  a control module for generating a physical address response frame, which contains a physical address of the network device, wherein said physical address has been converted to an address whose type is supported by a network from which a physical address request frame has been transmitted, in response to the physical address request frame received from a connecting device connecting a coordinator-based wireless network including the network device to a backbone network, and for extracting the physical address of the network device from a frame containing the physical address of the network device;
  a transceiving module for transmitting the physical address response frame generated by the control module, and receiving one of the physical address request frame and the frame containing the physical address of the network device; and
  a storage module for storing one of the physical address response frame generated by the control module and the frame containing the physical address of the network device provided from the transceiving module.

11. A hardware module storing a program for performing a communication method between a coordinator-based wireless network and a different type of network interconnected through a backbone network, the communication method comprising:
  a) receiving a physical address request frame from a connecting device connecting the coordinator-based wireless network to the backbone network;
  b) transmitting a physical address response frame, which contains a physical address and has been converted to an address whose type is supported by the different type of network from which the physical address request frame has been transmitted, to the connecting device after receiving the physical address request frame; and
  c) receiving a frame containing the physical address from the connecting device after transmitting the physical address response frame to the connecting device.

* * * * *